J. BAKER.
HANGER FOR LICENSE PLATES.
APPLICATION FILED SEPT. 21, 1910.
1,005,499.
Patented Oct. 10, 1911.
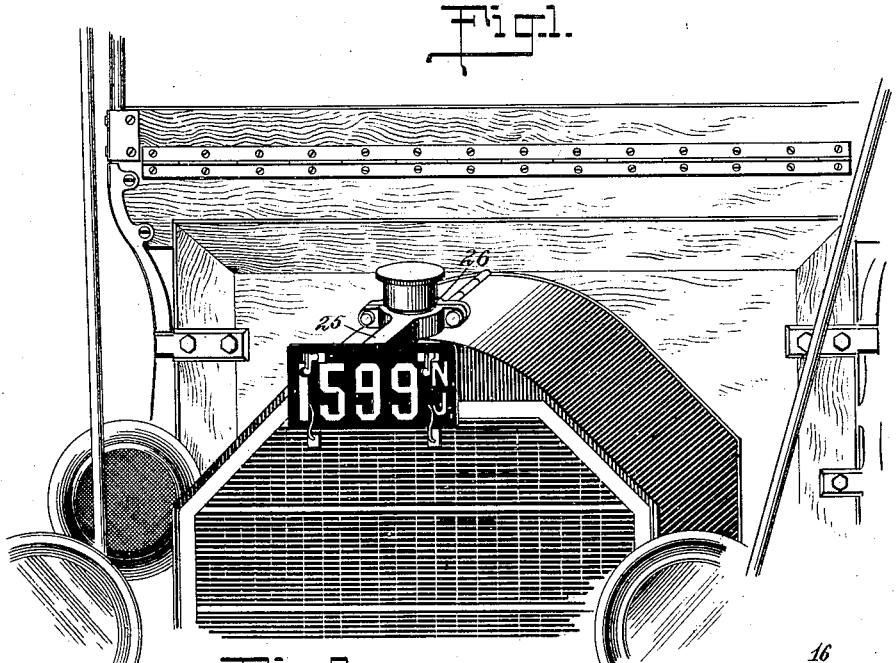
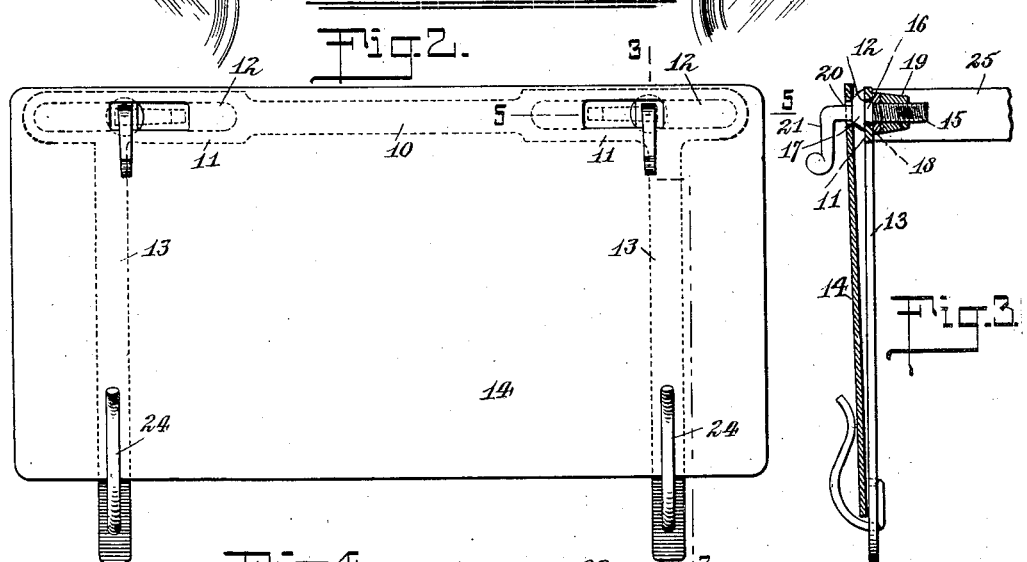
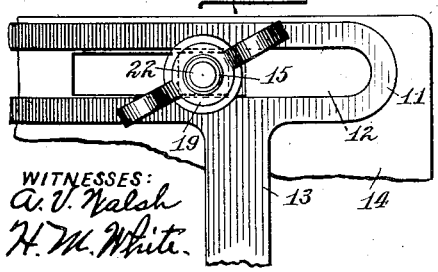
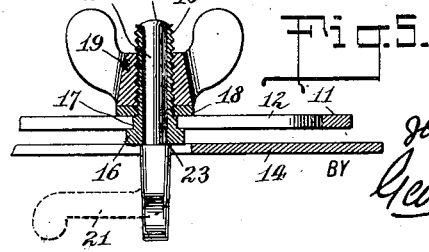
WITNESSES:
A. V. Walsh
H. M. White
INVENTOR
John Baker
BY George Bush
ATTORNEY

UNITED STATES PATENT OFFICE.

JOHN BAKER, OF PASSAIC, NEW JERSEY, ASSIGNOR TO JOHN B. HOPPER, OF RIDGEWOOD, NEW JERSEY.

HANGER FOR LICENSE-PLATES.

1,005,499.    Specification of Letters Patent.    Patented Oct. 10, 1911.

Application filed September 21, 1910. Serial No. 583,067.

*To all whom it may concern:*

Be it known that I, JOHN BAKER, a citizen of the United States, and a resident of Passaic, in the county of Passaic and State of New Jersey, have made and invented certain new and useful Improvements in Hangers for License-Plates, of which the following is a specification.

My invention relates to an improvement in hangers or supports adapted for use in connection with automobiles or similar vehicles, for exposing or displaying license pads or plates, the object of the same being to provide an article of this kind or character which shall be simple and cheap to manufacture, adjustable for securing it to the radiator filling tube of any diameter, and to which a license plate or pad may be easily and readily attached or removed therefrom.

With these and other ends in view, the device consists in certain novel features of construction and combinations of parts as will be hereinafter fully described and pointed out in the claims.

In the accompanying drawings, Figure 1 is a view in elevation of the forward end of an automobile having attached to the radiator tube my improved device with a license plate suspended thereon. Fig. 2 is a view in front elevation of my improved hanger, having a license plate attached thereto. Fig. 3 is a vertical sectional view taken on the line 3—3 of Fig. 2. Fig. 4 is a rear view of one end of the device having the license plate secured thereto. Fig. 5 is a sectional view taken on the line 5—5 of Fig. 2.

By reference to the drawings, it will be seen that my improved device consists of a frame comprising an upper cross-bar 10, the outer ends 11 of which are somewhat widened, and provided with the elongated slots or openings 12. From the bar 10, and near the outer ends thereof, extend downwardly the vertical arms or plates 13, the horizontal bar 10 and vertical bars or arms 13 being preferably cast or otherwise formed from one piece of metal, this frame being approximately the size of the license plates or pads as now ordinarily made or constructed.

For the purpose of suspending or removably holding the license pad or plate 14 on the hanger, I provide revolving supporting clips adjustable lengthwise of the horizontal bar 10 in the elongated slots 12 thereof, these clips being assisted by spring arms at the lower ends of the vertical arms 13 in holding the license plate. The revolving supporting clips are each constructed of a sleeve 15 threaded on its outer side and formed at one end with the flange 16 and squared shoulder 17, the latter being of such size as to fit within the elongated slots 12, in order to prevent said sleeve from turning, the flange 16 fitting against the front face of the widened portion of the bar 10 and bounding the slot 12.

On the sleeve 15 and upon the opposite side of the bar 10, that is, on the rear face of the widened portion 11, is fitted a washer 18, and threaded thereon is a nut 19, which when turned home, binds said portion 11 of the bar 10 between the washer 18 and flange 16, thereby holding the sleeve tightly in place at any desired point or place in the slot 12. By loosening the nut 19, the sleeve may be moved lengthwise of the bar in the slot, said nut 19 being subsequently turned up tightly against the washer to hold the sleeve in position. Through this sleeve 15 passes the clip proper, comprising the horizontal arm 20 and vertical arm 21, the rear end 22 of the arm 20 being enlarged or slightly upset to prevent its withdrawal from the sleeve. This arm 20 is also provided with a shoulder 23 fitting against the flange 16, whereby to permit of the rotation of the clip in the sleeve 15 without binding therein, and thus allow the vertical arm 21 to be brought into a horizontal position, as illustrated in dotted lines in Fig. 5.

To the lower end of each of the vertical arms 13 is secured a spring-clip 24, between the free end of which and the arm 13 fits the lower end of the license pad or plate 14. From the horizontal bar 10 extends rearwardly the arm 25, having formed thereon, or secured thereto, a clamping ring, by means of which the hanger may be attached to the radiator filling tube 26.

When it is desired to attach a license pad or plate to the hanger, the revolving clips are rotated to bring the arms 21 in a horizontal position, that is, lengthwise of the bar 10. The lower edge of the license plate 14 is then inserted between the spring-arms 24 and the vertical arms 13, and the license plate provided with the elongated slots 27 slipped over the revolving clips, the latter being then turned downwardly, as illustrated in Fig. 2, thus preventing the plate 14 from becoming detached from the hanger. To detach the license plate, it is simply necessary to again rotate the clips to their horizontal positions, whereupon they may be withdrawn from the slotted license plate, and the latter lifted out of engagement with the spring-arms.

From the foregoing it will be understood that the invention is exceedingly simple and economical to construct; that the license plate is easily and readily attached thereto and detached therefrom, and that the positions of the rotating clips can be readily adjusted to properly correspond with the location of the slots in the license plates, as now commonly constructed.

What I claim is:—

1. In a device of the character described, the combination with a frame comprising horizontal and vertical bars, and means for attaching the frame to a support, said horizontal bar being provided at its ends with elongated slots, of a sleeve adjustable in each of the slotted ends of said horizontal bar, means for securing said sleeves in their adjusted positions, clips fitted in each of said sleeves and adapted to rotate therein, and spring-arms fastened to the lower ends of said vertical bars, substantially as described.

2. In a device of the character described, a frame comprising a horizontal bar having an elongated slot adjacent each of its ends; a vertical bar adjacent each end of said horizontal bar and extending downward therefrom; securing means at the lower ends of said vertical bars for holding the lower edge of a license plate in place; a threaded sleeve adjustably secured in each of the slots aforesaid and having a nut whereby it may be held in its adjusted positions, said sleeve having a passage extending through it at right angles to the plane of said several bars; two clips adapted to engage the upper portion of a license plate to hold it in place, said clips having each a portion extending into the passage in said sleeves and loosely secured therein so as to be rotatable with reference to said sleeves; and a bracket secured to said horizontal bar and whereby the device may be supported.

Signed at Ridgewood township of Ridgewood in the county of Bergen and State of New Jersey, this 17th day of September, A. D. 1910.

JOHN BAKER.

Witnesses:
CHARLES R. STONEALL,
REXFORD B. WHITTEMORE.